Oct. 24, 1950 W. P. HARE 2,527,095
DIAL INDICATING DEVICE
Filed July 12, 1947
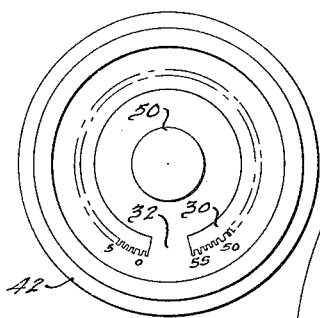
FIG.1.
FIG.2.
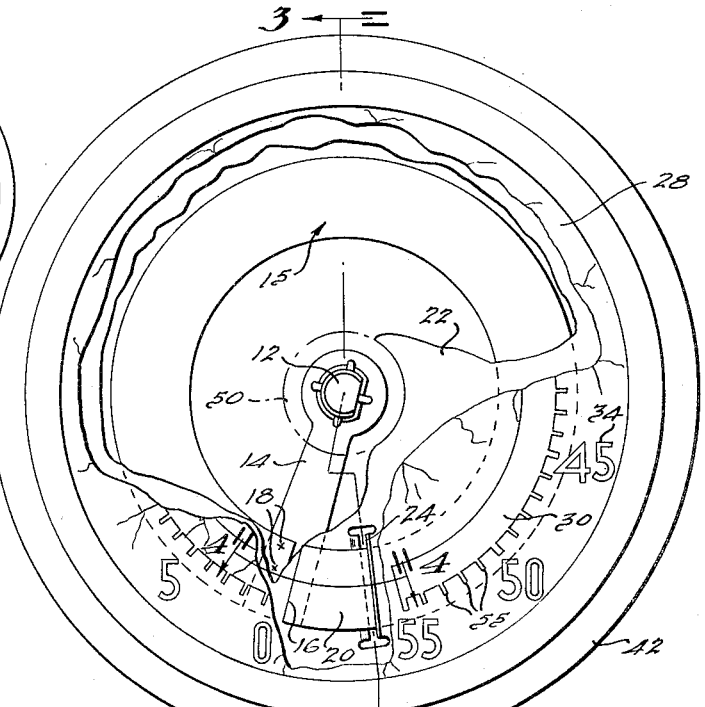
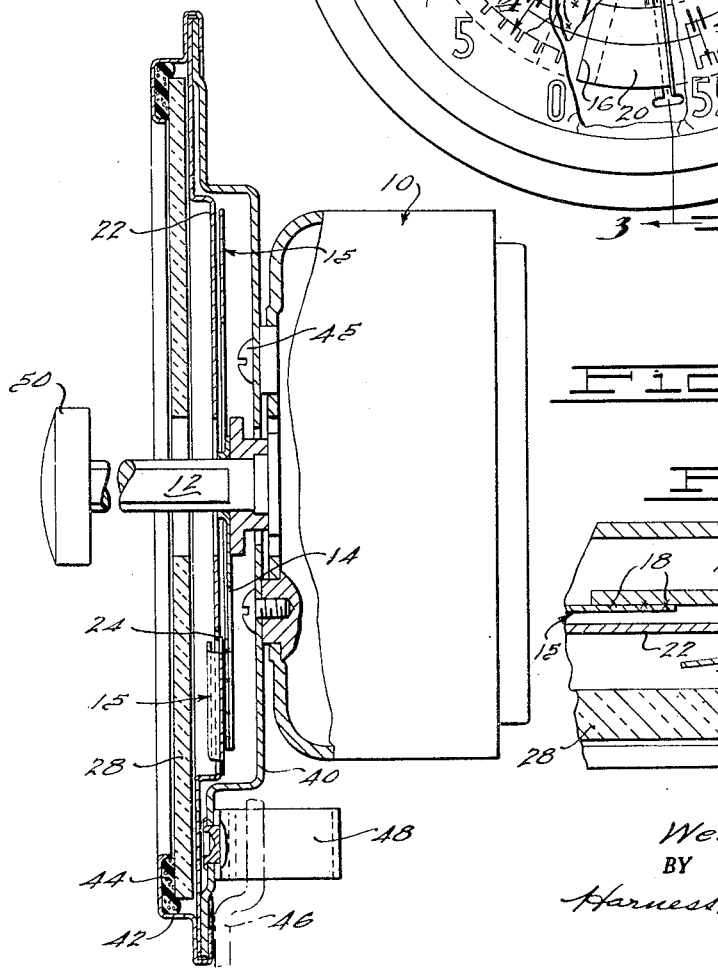
FIG.3.
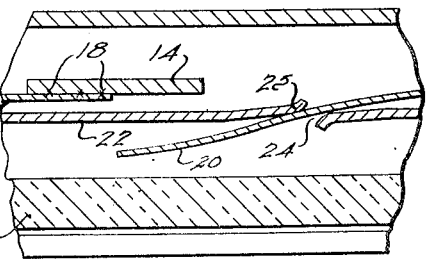
FIG.4.
INVENTOR.
Weldon P. Hare.
BY
Harness, Dickey & Pierce.
ATTORNEYS.

Patented Oct. 24, 1950

2,527,095

UNITED STATES PATENT OFFICE 2,527,095

DIAL INDICATING DEVICE

Weldon P. Hare, Ann Arbor, Mich., assignor to King-Seeley Corporation, Ann Arbor, Mich., a corporation of Michigan Application July 12, 1947, Serial No. 760,649

6 Claims. (Cl. 116—129)

The present invention relates to indicating devices for denoting the physical or angular positioning of a shaft or other object, the position of which may in turn be related to any condition, value or quanta as to which visual indication may be desired. The invention is particularly concerned with improvements adapted to render such devices more readily visible, and is for purposes of illustration but not of limitation depicted in connection with a dial-type indicator especially suitable for use with an automatically acting timing device of the clockwork type, to provide a continuous and readily visible indication of the time which remains unelapsed and which the associated timing device is set to measure. It will readily be perceived, however, that the improved indicating mechanism of the present invention is adaptable to many other uses.

An important object of the invention is to provide an improved indicating assembly of the type wherein a substantially flat flexible indicating shutter strip moves to and from a concealed position and over or with relation to a contrastingly colored dial or graduated scale, in such manner that the shutter strip is visible to greater or lesser extent, the visible length of the strip providing the index reading. A related object is to provide such an indicating device of improved, simplified and more easily readable character, having a protective graduated scale element or dial forming a cover for the assembly and the principal portion of which is opaque, a transparent window slot being provided in the dial, the indicating shutter strip being movable behind the window, to change the appearance of the window slot in accordance with the length of the shutter strip portion exposed to view therebeneath. Another object is to incorporate in such a device improved means for guiding the shutter to and from an invisible position as it is moved with relation to the window slot, together with novel actuating means for the shutter; the guiding means, actuating means, and dial being arranged coaxially and held against axial movement with relation to one another, and the assembly being of simple and rugged construction, reliable in operation and attractive in appearance.

Other objects and advantages will become apparent upon consideration of the present disclosure in its entirety.

In the drawings:

Fig. 1 is a front elevational view of an indicating device constructed in accordance with the present invention and suitable for use in conjunction with a clockwork timer;

Fig. 2 is a similar view upon a larger scale and with parts removed and broken away;

Fig. 3 is a cross section taken substantially on the line 3—3 of Fig. 2 and looking in the direction of the arrows, showing a timing device mounted as a unit with my improved indicator; and Fig. 4 is a detailed section taken substantially on the line 4—4 of Fig. 2 and looking in the direction of the arrows.

Referring now to the drawings, reference character 10 designates generally an adjustable timing device which may correspond to that disclosed in the copending application of Rex C. Darnell, Serial No. 659,764, filed April 5, 1946, entitled "Timer Mechanism." It will be appreciated however that the timing device itself forms no part of my present invention and is illustrated merely as typifying a mechanism with which my improved indicating means is adapted to be used. The timing device is indicated as provided with a setting shaft 12 which is adapted to be turned manually in one direction by means of a knob 50 to set the timer, and which returns automatically to its initial position as the timer runs down, the angular position of the shaft at any instant corresponding to the unelapsed time remaining to be measured by the timer. It has been common to attach a simple pointer to the actuating shaft of such a timer, which pointer may be a part of the setting knob or attached thereto and adapted to sweep over a graduated dial. Since the operation of the timer is such that the shaft returns to its original position as the timer runs down, the indicating means furnishes a constant representation of the remaining or unelapsed time. Such timers are used to assist in cooking and in the timing of other household operations, such as the operation of washing machines, and are also used in connection with laboratory work, including photographic dark-room operations. It will be appreciated that in many such applications it is important that the indicating means be clearly and quickly readable from a distance and under unfavorable light conditions, while in addition it is to be expected that such devices will be subjected to severe usage and to unfavorable atmospheric conditions so that ruggedness and reliability, despite such unfavorable factors, is also of great importance.

In accordance with the preferred embodiment of my present invention depicted in the drawings, I provide a rigid, flat sheet metal arm 14 fast upon the shaft 12 and carrying an indicating device in the form of a resilient annular shutter strip 15 which may be formed of thin sheet metal, spot welded or otherwise suitably secured at one extremity to the front face of arm 14 in such position as to be concentric with the axis of the shaft 12, the strip being flat when relaxed and tending to lie in a plane perpendicular to the shaft and substantially corresponding to the plane of movement of the face of arm 14. As best indicated in Fig. 2, the shutter strip is radially split along a line designated 16, which overlies the arm 14. Only one end of the shutter strip is secured to the arm, as by spot welding, at the points designated 18. The other end of the strip, which may be termed the leading end, is free to move axially away from the arm and is designated by the reference numeral 20.

Spaced forwardly from or nearer the free end of the shaft 12 than the plane of movement of the arm 14 and the attached end of the shutter strip is a flat opaque mask plate 22 which is formed of stiff but relatively thin material such as sheet metal and which is also disposed in a plane perpendicular to the shaft. The mask plate is spaced from the arm 14 a distance which is just sufficient to allow free movement of the arm and the shutter strip 15 behind the mask. The mask is provided with a radial slot 24 which is of sufficient length and so positioned that the leading end 20 of the indicator strip 15 may be threaded therethrough during assembly of the parts. The slot is formed by a sheared line adjacent which the material of the mask is formed away from the plane of the mask, in opposite directions upon opposite sides of the line of the shear cut, as indicated at 25. Smooth guiding surfaces are thus provided for the ribbon-like shutter strip 15. It will be appreciated that the shutter strip is capable of taking the slight necessary reverse bend imposed by its passage through the slot without stressing the material of which the strip is formed beyond its elastic limit. Because of the gradual nature of the bend to which the shutter strip is subjected it need not be so thin as to be of delicate character, and in fact the arm 14 and the shutter strip may even be stamped from a single piece of metal.

Over the face of but spaced from the mask 22 a dial 28 is fitted. The dial is also parallel to the mask and the plane of movement of the arm 14 and is preferably spaced relatively close to the mask 22, its clearance with respect to the mask being sufficient, however, to permit free movement between the mask and dial of the portion of the indicating shutter strip 15 which projects through the slot 24. The dial is preferably opaque, except for a segmental window area designated 30 which overlies the path of movement of the shutter strip. In the preferred construction shown the window is only 30° less than a complete annulus, the 30° opaque area between the ends of the window being located at the bottom of the dial and designated 32. The dial may be formed of glass, although this is a matter of choice. In the preferred construction shown, transparent glass is employed which is coated with paint, except in the window area 30. Suitable indicia as 34 may also be painted or otherwise suitably inscribed upon the outer face of the dial, although if the dial is to be illuminated from the rear, the indicia may of course be comprised of transparent or translucent areas, as may be desired. Graduations coacting with the indicia 34 may also be formed by means of transparent notches as 55 constituting radial extensions of the transparent window area 30 and spaced conformably to the indicia, the graduations and the indicia, in the preferred construction depicted in the drawing, being calibrated to denote minutes of time.

The shutter strip 15 is preferably colored upon its surface to contrast with the frontal appearance of both the dial and the portion of the mask visible through the window when not covered by the shutter, and it will be apparent that the angular extent of the portion of the strip visible through the segmental window 30 corresponds to the angular position of the arm 14 and shaft 12, which is in turn related to the functioning of the device 10.

In the preferred construction shown, a dished annular supporting plate 40 is also provided beneath the arm 14, formed of heavier gauge sheet metal and of somewhat greater radius than the other previously mentioned components of the dial assembly. A sheet-metal bezel 42 embraces the rim of the supporting plate 40 and is contoured, as by rolling, to frictionally hold and press together the annular mask 22 and dial 28. A resilient gasket as 44 formed of sponge rubber or the like is preferably interposed between the dial and the portion of the bezel which overlies the dial, as shown in Fig. 3. If desired, the device 10 to which the dial assembly is appurtenant may also be supported by the plate 40, as by simple machine screws 45, so that the complete assembly of timing device and dial may be supported as a unit, as for example in a suitable supporting panel 46, as by spring clips 48.

In the illustrative embodiment depicted in the drawing, a knob 50 is indicated fast upon the shaft 12, by means of which the arm 14 and strip 15 may be turned, the knob in the embodiment shown also functioning as setting means for the timing device.

Although sufficiently resilient to bend easily in the long radius curves it is required to assume as it passes through the slot 24, the ribbon 15 is stiff enough so that it will not buckle or bend sharply back upon itself when pushed forwardly through the slot, or tend to straighten and bind as it is pulled outwardly (back toward zero).

When used upon a timing device of the indicated character, the ribbon is automatically turned counterclockwise, as viewed in Fig. 2, as the timer runs down, in a direction opposite to that in which it is moved during setting, the portion of the ribbon visible through the window 30 being gradually diminished at such rate that it constantly indicates the remaining unelapsed time, as will be apparent. When the timer has fully run down, the leading end 20 of the ribbon remains projected through the slot 24 but such leading end is then retracted to a position under opaque area 32, so that no part of the ribbon remains visible through the window.

While it will be apparent that the preferred embodiment of my invention herein disclosed is well calculated to fulfill the objects and advantages first above stated, it will be apparent that the invention is susceptible to variation, modification, and change without departing from the proper scope and fair meaning of the appended claims.

I claim:

1. An indicating device adapted to furnish an indication of the angular position of a rotatable element, comprising a generally opaque and substantially flat dial having a segmental window therein and including an opaque area between the ends of the segmental window, a mask element arranged substantially parallel to but spaced from the dial and having a generally radial slot therein in circumferential alignment with the window but located beneath said opaque area, a supporting arm rotatable concentrically with respect to the axis of the segmental window, a substantially flat and narrow segmental indicating shutter formed of relatively thin and resilient material, corresponding in radius and in positioning to the segmental window, the shutter being carried at one end by said supporting arm and projecting through said slot and unsecured at its other end, and means for rotating the arm, whereby unsecured portions of said shutter may be moved through said slot and to and from a visible position in which said unsecured portions lie in the space between the mask and dial and may be observed through the window, and whereby when moved out of said space said unsecured shutter portions lie upon the opposite side of the mask from the side occupied by said dial and are concealed by the mask from observation through the window.

2. An indicating device including a substantially flat and opaque scale having an elongated window therein and including an opaque area at one end of the window, a mask arranged substantially parallel to but spaced from the scale and having a slot therein extending transversely with respect to the window and in longitudinal alignment therewith but located beneath said opaque area at the end of the window, a substantially flat indicating shutter formed of relatively thin and resilient material which is easily bendable but resistant to compression and extension, said shutter extending through said slot and having an unsecured end portion movable longitudinally beneath the window in the space between the scale and mask, an actuating member movable substantially colinearly with respect to the window on the opposite side of the mask from said scale, the shutter comprising an extension of said member, whereby the unsecured portion of the shutter may be moved through said slot between an invisible position behind the mask and a visible position in which it lies between the mask and scale and is observable through the window.

3. Indicating means as set forth in claim 2 in which said mask and scale are provided with adjacent perimetric flanges and with spacedly offset and substantially parallel intermediate portions providing said aforementioned space, and means for securing the flanges together.

4. Indicating means as set forth in claim 2 in which said mask and scale are provided with adjacent perimetric flanges and with spacedly offset and substantially parallel intermediate portions providing said aforementioned space, a sheet metal housing element arranged upon the side of said mask opposite to said scale and having a perimetric flange adjacent the previously mentioned flanges, an intermediate area of the housing element being laterally offset with respect to said mask, said actuating element being movable in the space between said mask and housing, and means for securing the flanges together.

5. An indicating device as defined in claim 1 in which said mask and dial are provided with adjacent peripheral flanges, intermediate areas of the mask and dial being laterally offset from one another to provide the aforementioned space, and means for securing said flanges together.

6. An indicating device as defined in claim 1 in which said mask and dial are provided with adjacent peripheral flanges, intermediate areas of the mask and dial being laterally offset from one another to provide the aforementioned space, a housing member arranged upon the side of the mask opposite to that occupied by the scale and having a peripheral flange adjacent the aforementioned flanges, and having an intermediate portion laterally offset from the mask, said arm and the secured portion of the shutter being movable in the space between said housing and mask, and means for securing said flanges together.

WELDON P. HARE.

REFERENCES CITED

The following references are of record in the file of this patent:

UNITED STATES PATENTS

| Number | Name | Date |
| --- | --- | --- |
| 201,637 | Treat | Mar. 26, 1878 |
| 1,468,235 | Japy | Sept. 18, 1923 |
| 2,255,188 | Rieper | Sept. 9, 1941 |